United States Patent
Poole

(10) Patent No.: US 10,436,922 B2
(45) Date of Patent: Oct. 8, 2019

(54) DEVICE AND METHOD FOR CONSTRAINED WAVE-FIELD SEPARATION

(71) Applicant: CGG SERVICES SA, Massy (FR)

(72) Inventor: Gordon Poole, East Grinstead (GB)

(73) Assignee: CGG SERVICES SAS, Massy (FR)

( * ) Notice: Subject to any disclaimer, the term of this patent is extended or adjusted under 35 U.S.C. 154(b) by 212 days.

(21) Appl. No.: 15/276,961

(22) Filed: Sep. 27, 2016

(65) Prior Publication Data

US 2017/0097432 A1 Apr. 6, 2017

Related U.S. Application Data

(60) Provisional application No. 62/236,996, filed on Oct. 5, 2015.

(51) Int. Cl.
*G01V 1/36* (2006.01)
*G01V 1/28* (2006.01)
(Continued)

(52) U.S. Cl.
CPC ............... *G01V 1/36* (2013.01); *G01V 1/282* (2013.01); *G01V 1/325* (2013.01); *G01V 1/368* (2013.01);
(Continued)

(58) Field of Classification Search
CPC . G01V 1/36; G01V 1/38; G01V 1/282; G01V 1/325; G01V 2210/74; G01V 2210/679; G01V 2210/512; G01V 2210/46
See application file for complete search history.

(56) References Cited

U.S. PATENT DOCUMENTS 4,992,992 A 2/1991 Dragoset, Jr.
6,775,618 B1 * 8/2004 Robertsson ............ G01V 1/364
702/14

(Continued)

FOREIGN PATENT DOCUMENTS

GB 2 442 854 A 4/2008
WO 2015/145256 A2 10/2015
(Continued)

OTHER PUBLICATIONS

G. Poole et al., "3D Source Designature Using Source-receiver Symmetry in the Shot Tau-px-py Domain", 77th EAGE Conference & Exhibition 2015, IFEMA Madrid, Spain, Jun. 1-4, 2015.
(Continued)

*Primary Examiner* — Mohammad K Islam
(74) *Attorney, Agent, or Firm* — Patent Portfolio Builders PLLC

(57) ABSTRACT

Computing device, computer instructions and method for up-down separation of seismic data. The method includes receiving the seismic data, which includes hydrophone data and particle motion data; performing a first up-down separation, which is independent of a ghost model, using as input the hydrophone data and the particle motion data, to obtain first up-down separated data; performing a second up-down separation by using as input a combination of (i) the hydrophone data and/or the particle motion data and (ii) the first up-down separated data, wherein an output of the second up-down separation is second up-down separated data; and generating an image of the subsurface based on the second up-down separated data.

20 Claims, 6 Drawing Sheets

(51) Int. Cl.
*G01V 1/32* (2006.01)
*G01V 1/38* (2006.01)

(52) U.S. Cl.
CPC ........ *G01V 1/38* (2013.01); *G01V 2210/1293* (2013.01); *G01V 2210/1423* (2013.01); *G01V 2210/244* (2013.01); *G01V 2210/32* (2013.01); *G01V 2210/43* (2013.01); *G01V 2210/46* (2013.01); *G01V 2210/47* (2013.01); *G01V 2210/512* (2013.01); *G01V 2210/56* (2013.01); *G01V 2210/677* (2013.01); *G01V 2210/679* (2013.01); *G01V 2210/74* (2013.01)

(56) References Cited

U.S. PATENT DOCUMENTS

| | | | |
|---|---|---|---|
| 7,359,283 B2 | 4/2008 | Vaage et al. | |
| 8,593,904 B2 | 11/2013 | Soubaras | |
| 8,693,282 B2 | 4/2014 | Ozdemir et al. | |
| 9,103,941 B2 | 8/2015 | Poole | |
| 2003/0028326 A1* | 2/2003 | Monk | G01V 1/36 702/14 |
| 2008/0259726 A1 | 10/2008 | van Manen et al. | |
| 2012/0213032 A1 | 8/2012 | Herrmann et al. | |
| 2013/0163376 A1 | 6/2013 | Poole | |
| 2013/0163379 A1 | 6/2013 | Poole | |
| 2013/0301386 A1* | 11/2013 | Grion | G01V 1/28 367/24 |
| 2014/0043936 A1* | 2/2014 | Poole | G01V 1/38 367/21 |
| 2015/0012221 A1* | 1/2015 | Bansal | G01V 1/303 702/18 |
| 2015/0109881 A1 | 4/2015 | Poole et al. | |
| 2015/0212222 A1 | 7/2015 | Poole | |
| 2015/0362611 A1* | 12/2015 | Lecerf | G01V 1/28 367/7 |
| 2016/0084975 A1* | 3/2016 | Ferber | G01V 1/28 702/18 |
| 2016/0109590 A1* | 4/2016 | Goertz | G01V 1/288 702/14 |
| 2016/0109596 A1* | 4/2016 | Murray | G01V 1/36 367/24 |
| 2016/0139283 A1* | 5/2016 | Kamil | G01V 1/364 702/17 |
| 2016/0170054 A1* | 6/2016 | Hegna | G01V 1/36 367/24 |
| 2016/0238726 A1* | 8/2016 | Lu | G01V 1/36 |
| 2016/0245941 A1* | 8/2016 | Ronholt | G01V 1/282 |

FOREIGN PATENT DOCUMENTS

| | | |
|---|---|---|
| WO | 2015/159149 A2 | 10/2015 |
| WO | 2016/038458 A2 | 3/2016 |
| WO | 2016/065277 A1 | 4/2016 |

OTHER PUBLICATIONS

G. Poole, "Pre-migration Receiver De-ghosting and Re-datuming for Variable Depth Streamer Data", SEG Annual Meeting, Houston, Texas, 2013, pp. 4216-4220.

G. Poole et al, "Shot-to-shot Directional Designature Using Near-field Hydrophone Data", SEG Annual Meeting, Houston, Texas, 2013, pp. 4236-4240.

G. Poole et al., "Simultaneous Source Designature and Receiver Deghosting in the Joint Shot-receiver Domain", 78th EAGE Conference & Exhibition 2016, Vienna, Austria, May 30, 2016.

G. Poole, "Wavefield Separation Using Hydrophone and Particle Velocity Components with Arbitrary Orientation", SEG Annual Meeting, Denver, Colorado, 2014, pp. 1858-1862.

P. Wang et al., "3D Joint Deghosting and Crossline Interpolation for Marine Single-component Streamer Data", SEG Annual Meeting, Denver, Colorado, 2014, pp. 3594-3598.

P. Wang et al., "Joint Hydrophone and Accelerometer Receiver Deghosting Using Sparse Tau-P Inversion", SEG Annual Meeting, Denver, Colorado, 2014, pp. 1894-1898.

P. Wang et al., "Premigration Deghosting for Marine Streamer Data Using a Bootstrap Approach in Tau-P Domain", SEG Annual Meeting, Houston, Texas, 2013, pp. 4221-4225.

P. Wang et al., "Premigration Deghosting for Marine Towed Streamer Data Using a Bootstrap Approach", SEG Annual Meeting, Las Vegas, Nevada, 2012, pp. 1-5.

Extended European Search Report in corresponding European Application No. EP 16 30 6278 dated Feb. 27, 2017.

\* cited by examiner

DEVICE AND METHOD FOR CONSTRAINED WAVE-FIELD SEPARATION

CROSS-REFERENCE TO RELATED APPLICATIONS

The present application is related to and claims the benefit of priority from U.S. Provisional Application 62/236,996, filed Oct. 5, 2015, titled, "Method for constrained wavefield separation," and authored by G. Poole, the entire contents of which are incorporated herein by reference.

BACKGROUND

Technical Field

Embodiments of the subject matter disclosed herein generally relate to methods and systems and, more particularly, to mechanisms and techniques for separating up- and down-going wave-fields based on multicomponent seismic data.

Discussion of the Background

Marine seismic data acquisition and processing generate a profile (image) of the geophysical structure (subsurface) under the seafloor. While this profile does not provide an accurate location for oil and gas reservoirs, it suggests, to those trained in the field, the presence or absence of the oil and/or gas reservoirs. Thus, providing a high-resolution image of the subsurface is an ongoing process for the exploration of natural resources.

During a seismic gathering process, as shown in FIG. 1, a vessel 110 tows plural detectors 112, which are disposed along a cable 114. Cable 114 together with its corresponding detectors 112 are sometimes referred to, by those skilled in the art, as a streamer 116. Vessel 110 may tow plural streamers 116 at the same time. Streamers may be disposed horizontally, i.e., lie at a constant depth $z_1$ relative to the ocean surface 118. Also, plural streamers 116 may form a constant angle (i.e., the streamers may be slanted) with respect to the ocean surface as disclosed in U.S. Pat. No. 4,992,992, the entire content of which is incorporated herein by reference or the streamers may have a variable-depth profile as disclosed in U.S. Pat. No. 8,593,904, the entire content of which is incorporated herein by reference.

Still with reference to FIG. 1, vessel 110 may also tow a seismic source 120 configured to generate an acoustic wave 122a. Acoustic wave 122a propagates downward and penetrates the seafloor 124, eventually being reflected by a reflecting structure 126 (reflector R). Reflected acoustic wave 122b propagates upward and is detected by detector 112. For simplicity, FIG. 1 shows only two paths 122a corresponding to the acoustic wave. Parts of reflected acoustic wave 122b (primary or up-going) are recorded by various detectors 112 (recorded signals are called traces) while parts of reflected wave 122c pass detectors 112 and arrive at the water surface 118. Since the interface between the water and air is well approximated as a quasi-perfect reflector (i.e., the water surface acts as a mirror for acoustic waves), reflected wave 122c is reflected back toward detector 112 as shown by wave 122d in FIG. 1. Wave 122d is normally referred to as a ghost wave (or down-going wave). Ghosts are also recorded by detector 112, but with a reverse polarity and a time lag relative to primary wave 122b if the detector is a hydrophone. The degenerative effect that ghost arrival has on seismic bandwidth and resolution is known. In essence, interference between primary and ghost arrivals causes notches, or gaps, in the frequency content recorded by detectors.

The recorded traces may be used to image the subsurface (i.e., earth structure below surface 124) and to determine the position and presence of reflectors 126. However, ghosts disturb the accuracy of the final image of the subsurface and, for at least this reason, various methods exist for removing ghosts, i.e., deghosting, from the acquired seismic data. These methods were designed for deghosting seismic data h recorded with hydrophones, as described by the following equation:

$$h = Lp \quad (1)$$

or, in the expanded matrix form, $$\begin{pmatrix} h_1 \\ h_2 \\ h_N \end{pmatrix} (e^{-2\pi i f \tau_u} + \mathrm{Re}^{-2\pi i f \tau_d}) \begin{pmatrix} p_1 \\ p_2 \\ p_3 \\ p_M \end{pmatrix}, \quad (2)$$

where column vector h contains a frequency slice from the shot domain data (known), column vector p contains the surface datum tau-p model (unknown), matrix L makes the transform (known) from the surface tau-p model to the input shot data, and R is the free surface reflectivity (often taken to be −1). Matrix L combines in this case the operations of reverse tau-p transform, redatuming and reghosting.

The time shifts for primary (up-going) and ghost (down-going) wave fields are given by:

$$\tau_u = (o_n + \Delta o)s_{xm} - \Delta\tau \quad (3)$$

$$\tau_d = (o_n - \Delta o)s_{xm} + \Delta\tau, \quad (4)$$

where $o_n$ is the offset of a given trace in column vector h, $s_{xm}$ is the slowness in x-direction of a given trace in the surface tau-p model, $\Delta o$ is the offset perturbation as described in U.S. Pat. 9,103,941 (the '941 patent), and $\Delta t$ is the temporal perturbation as also described in the '941 patent. Equation (1) can be solved in the time or spectral (e.g., frequency) domain using linear inversion. The method can be applied on the whole shot (cable-by-cable) or in spatial windows of a user-defined number of channels.

However, existing methods relate to pressure measurements h made, for example, by hydrophones. Currently, the new streamer generation is capable of measuring not only pressure but also particle motion data, e.g., displacement, velocity, differential pressure, acceleration, etc. Thus, there is a desire to process not only pressure measurements, but also particle motion data. Accordingly, it would be desirable to provide systems and methods with such capabilities.

SUMMARY

According to an embodiment, there is method for up-down separation of seismic data that includes a step of receiving the seismic data, which includes hydrophone data and particle motion data; a step of performing a first up-down separation, which is independent of a ghost model, using as input the hydrophone data and the particle motion data, to obtain first up-down separated data; a step of performing a second up-down separation by using as input a combination of (i) the hydrophone data and/or the particle motion data and (ii) the first up-down separated data, wherein an output of the second up-down separation is second up-down separated data; and a step of generating an image of the subsurface based on the second up-down separated data.

According to another embodiment, there is a computing device for up-down separation of seismic data. The computing device includes an interface configured to receive the seismic data, which includes hydrophone data and particle motion data and a processor connected to the interface. The processor is configured to perform a first up-down separation, which is independent of a ghost model, using as input the hydrophone data and the particle motion data, to obtain first up-down separated data, perform a second up-down separation by using as input a combination of (i) the hydrophone data and/or the particle motion data and (ii) the first up-down separated data, wherein an output of the second up-down separation is second up-down separated data, and generate an image of the subsurface based on the second up-down separated data.

According to still another embodiment, there are computer-readable mediums including computer executable instructions, wherein the instructions, when executed by a processor, implement one or more of the methods as noted in the above paragraphs.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
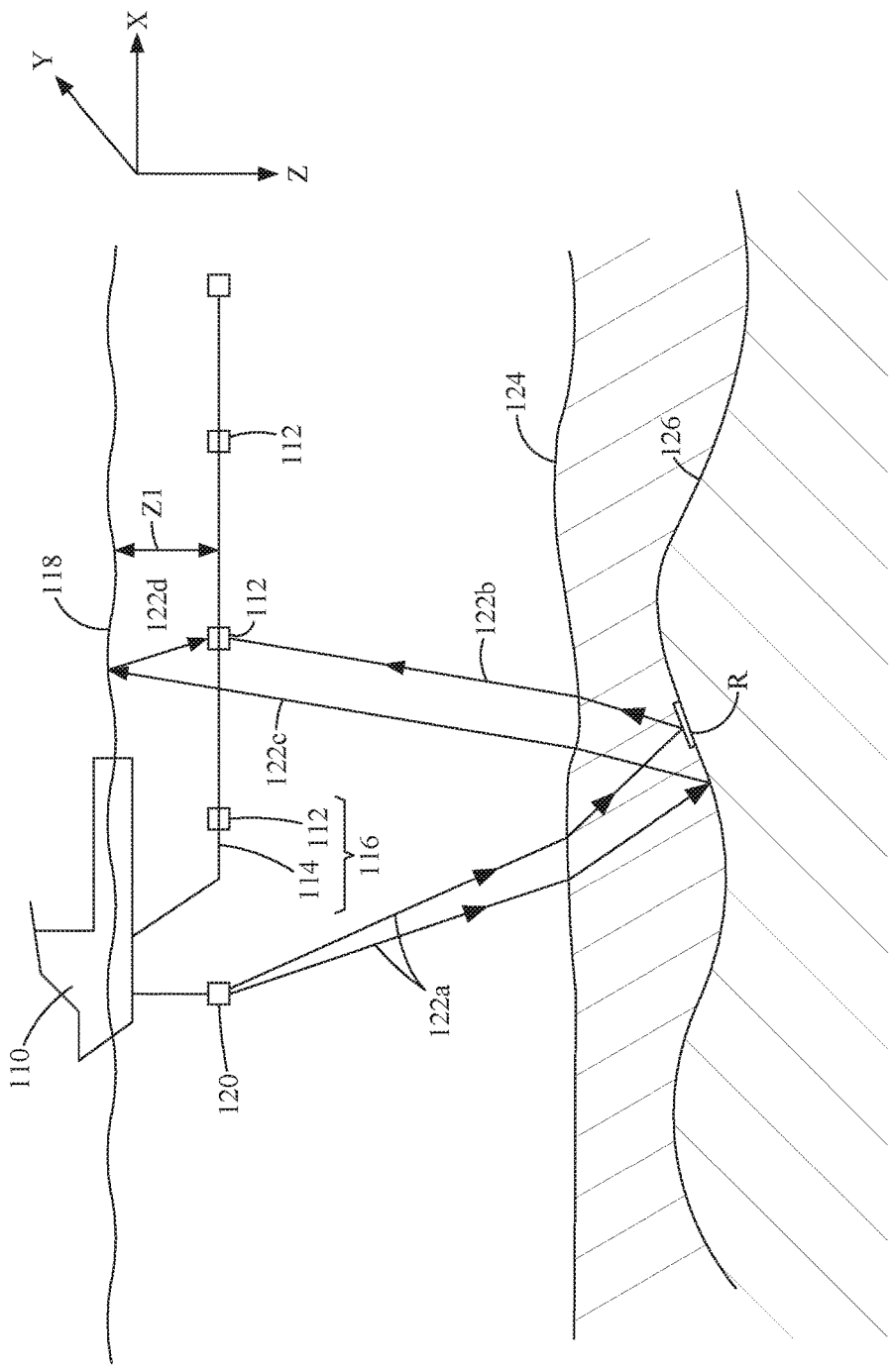
FIG. 1 is a schematic diagram of a conventional seismic data acquisition system having a horizontal streamer.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to pressure and particle velocity measurements associated with marine seismic data. However, the embodiments to be discussed next are not limited to these measurements. Other measurements, e.g., particle displacement and/or particle acceleration measurements, may be used instead of or in addition to particle velocity measurements and also the seismic data may be recorded on land, air, etc. Thus, a generic name for velocity, displacement, pressure gradient, and acceleration measurements is particle motion data.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, hydrophone and vertical particle velocity receiver data collected from receivers (located on streamer, ocean bottom cable, autonomous vehicles, etc.) are processed as now discussed.

Note that although the following discussion focusses on particle velocity, it should be understood that such data may have been derived from particle acceleration or particle motion data by integration or differentiation as is known in the prior art. Alternatively, the following formulas may be modified to accommodate, for example, particle acceleration data directly by including a differentiation within the formation in a method similar to that described by Wang, P., Jin, H., Peng, C., Ray, S., 2014, Joint hydrophone and accelerometer receiver deghosting using sparse Tau-P inversion, SEG conference proceedings.

When vertical particle velocity data is available, and assuming 2D propagation, the transfer function or operator L (see equation (1), i.e., h=Lp) can be extended so that the tau-p model "p" simultaneously satisfies hydrophone and vertical particle velocity data "vz" after calibration, i.e., $$\begin{pmatrix} h_1 \\ h_2 \\ h_{N_h} \\ vz_1 \\ vz_2 \\ vz_{N_p} \end{pmatrix} = \begin{pmatrix} e^{-2\pi i f \tau_u} + \text{Re}^{-2\pi i f \tau_d} \\ \cos\theta_m(e^{-2\pi i f \tau_u} - \text{Re}^{-2\pi i f \tau_d}) \end{pmatrix} \begin{pmatrix} p_1 \\ p_2 \\ p_3 \\ p_M \end{pmatrix}, \tag{5}$$

where $\tau_u$ is the time shift for the up-going wave and $\tau_d$ is the time shift for the down-going wave. The time shifts may be defined similar to those of equations (3) and (4) or in a different manner, depending on the model used to describe the wave propagation. For example, the time shifts may also be defined as:

$$\tau_u = o_n s_{xm} - z_n s_{zm} \tag{6}$$

$$\tau_d = o_n s_{xm} + z_n s_{zm} \tag{7}$$

where $z_n$ is the receiver depth, and $s_{zm}$ is the slowness in the z-direction. Note that given the water velocity, v, the following relation links $s_{xm}$ and $s_{zm}$: $1/v^2 = s_{xm}^2 + s_{zm}^2$. The top of the L matrix and the top of the data vector relate to the $N_h$ hydrophone measurements, and the bottom of the matrix L and the bottom of the data vector relate to the $N_p$ vertical particle velocity measurements. The term $\cos\theta_m$ in matrix L represents an obliquity factor for a given slowness, e.g., $\sin\theta_m = \pm v_w |s_m|$, where $s_m$ is the slowness for the $m^{th}$ trace (s/m), and $v_w$ is the water velocity between the receivers and sea surface (m/s). The sign should be taken from the sign of $s_m$. The water velocity may be fixed or allowed to vary during the duration of an acquisition. The obliquity factor takes into consideration the inclination $\theta_m$ of each recorded ray relative to a receiver orientation and the receiver orientation may be defined as an angle relative to a vertical axis, e.g., gravity. In other words, the receivers in the streamers can have any orientation due to twisting of the streamer. The raw measurements are then rotated to, for example, a vertical direction and a direction perpendicular to the streamer. Other directions may be used. Therefore, the obliquity term corrects recorded amplitudes based on the difference in the orientation of the recording receiver and a direction of an incoming wavefield. Note that the receiver orientation is different from obliquity. While obliquity is an amplitude term only, the receiver orientation has to do with the orientation of the receivers. In this regard, imagine that the receiver is a single axis accelerometer. Ideally, the receiver's orientation may be aligned with the vertical direction (z axis) or the cross-line direction (y axis) of the nominal shooting direction or zero feather direction (other directions may be preferred; normally two orthogonal directions). However, the streamer experiences twisting and other movements (e.g., feathering) while being towed in water. Thus, the actual orientation of the receiver is most likely neither along the vertical direction nor along the cross-line direction. Note that in some cases a vertical sensor may be gimballed in an attempt to orientate it vertically. The raw measurements from the plural receivers may or may not have been rotated in a plane perpendicular to the streamer at the location of the receiver prior to being received for processing. Further complications are introduced when the streamer is slanted or has a curved profile because the vertical orientation of the receivers is not vertical. A method for correctly handling input data that is not ideally aligned with the y and z directions is discussed in U.S. Patent Application Publication 2015/0212222.

It is known that receiver ghost troughs in hydrophone data correspond to peaks on vertical particle velocity receiver data. In the formulation represented by equation (5), a single surface datum tau-p model is derived to satisfy both hydrophone and vertical particle velocity receiver data. As peaks in vertical particle velocity receiver data correspond to troughs in hydrophone data, the dual modelling approach of equation (5) can be more robust than working with either hydrophone or vertical particle velocity measurements in isolation. Once the surface datum tau-p model of up-going energy has been found, it may be used to output up-going or down-going energy at any datum and offset.

However, particle velocity measurements vz include significant noise at low frequencies due to the nature of the accelerometers. Thus, equation (5) can be modified with a low cut filter LC applied to the particle velocity measurements to remove the low frequencies, to reduce the negative effect of the noise, as follows:

$$\begin{pmatrix} h_1 \\ h_2 \\ h_{N_h} \\ LC(v_{z1}) \\ LC(v_{z2}) \\ LC(v_{zN_p}) \end{pmatrix} = \begin{pmatrix} e^{-2\pi i f \tau_u} + Re^{-2\pi i f \tau_d} \\ LC(\cos\theta_m(e^{-2\pi i f \tau_u} + Re^{-2\pi i f \tau_d})) \end{pmatrix} \begin{pmatrix} p_1 \\ p_2 \\ p_3 \\ p_M \end{pmatrix}, \quad (8)$$

Each trace will have its own delay based on the trace's individual offset-x, offset-y and depth (i.e., its coordinates in the space domain). Note that because each trace has its own offset-x, offset-y and depth, the L matrix also depends on the offset-x, offset-y and depth of the traces.

Equations (5) and (8) are solved by inversion to find a wave-field separated model p (that includes up-going wave-fields U and down-going wave-fields D), satisfying jointly the hydrophone data h and the particle velocity data vz assuming a flat sea surface. If the sea surface is not flat, the wave height can be taken into consideration when performing the inversion, as disclosed in International Patent Application PCT/IB2015/001930, assigned to the assignee of this application.

However, the image of the subsurface calculated with the separated U and/or D wave-fields obtained from equations (5) and/or (8) is still not as accurate as would be possible.

Figure 2:
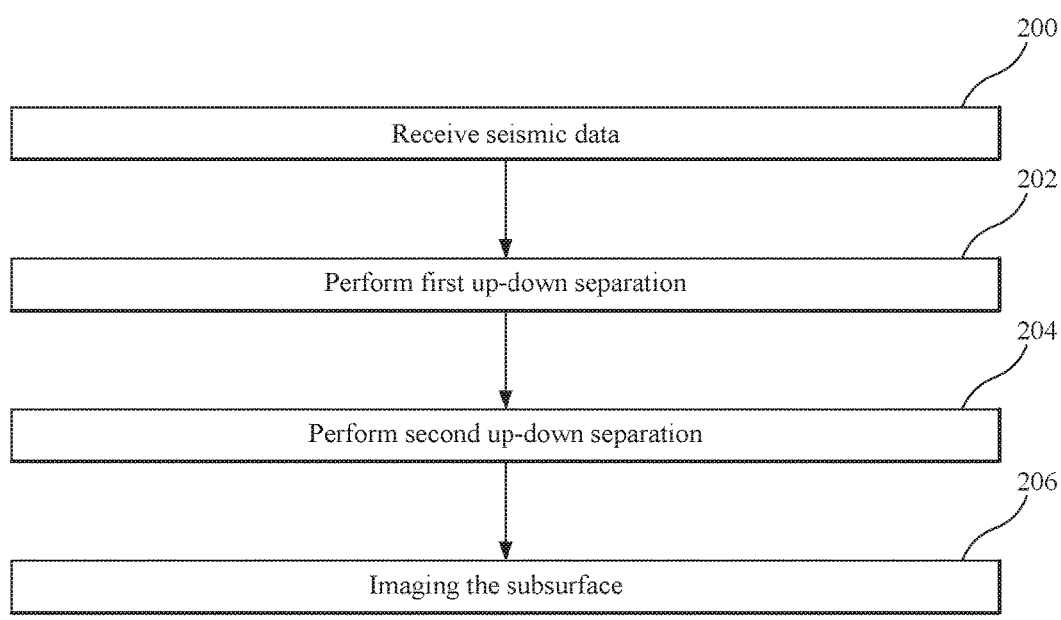
FIG. 2 is a flowchart of a method for separating up-going wave-fields from down-going wave-fields with two wave-field separation processes, in which a first process constraints the second process.

Thus, the inventor of this application has discovered that the accuracy of the image can be improved if instead of using a single wave-field separation method (as represented by equations (5) or (8)), two wave-field separation methods are used, with the second wave-field separation method being constrained/influenced/driven by the first wave-field separation method. In other words, a method for up-down separation of seismic data includes, as illustrated in FIG. 2, a step 200 of receiving hydrophone data and particle velocity data (or other two different types of data), a step 202 of performing a first up-down separation, which is independent of ghost modelling, and this first up-down separation uses as input the hydrophone data and the particle velocity data from step 200, to obtain first up-down separated data. The method further includes a step 204 of performing a second up-down separation by using as input a combination of (i) at least a portion of the original seismic data, e.g., only the hydrophone data, or only the particle motion data, or both of them, and (ii) the first up-down separated data, and a step 206 of imaging the subsurface using an output of the second wave-field separation step. This method is now discussed in more detail with regard to FIG. 2.

In step 200, the received seismic data is recorded during a land seismic survey, marine seismic survey, ocean bottom seismic survey, autonomous receiver survey, aerial seismic survey, or any other type of seismic survey. The received seismic data is recorded with at least two different types of sensors, e.g., hydrophones and accelerometers, hydrophones and geophones, etc. Thus, the seismic data includes pressure measurements (from the hydrophones) and particle motion related data (from the geophones or accelerometers) or other types of data. The particle motion related data may be a velocity, acceleration, displacement, etc. These two types of data (e.g., pressure and particle motion), are called multi-component seismic data. The different types of data may or may not be co-located, and may relate to the combination of measurements from several sensors (for example analogue or digital array formation). Those skilled in the art would understand that other types of data may be used to generate the multicomponent seismic data as long as there are two different types of data. For the sake of simplicity, herein, the two types of data are considered to be hydrophone data h and particle motion velocity v. Also for simplicity, a two-dimensional (2D) scenario is considered herein, and thus, the particle motion velocity v along the z-direction is considered to be the vertical particle motion velocity vz. However, the method discussed herein equally applies to 1D or 3D or 4D cases.

The first up-down separation step 202 may use any known wave-field separation method. In one embodiment, the first up-down separation step does not use an inversion. An inversion is a method that calculates from a model p, based on a known matrix L, the seismic data d that would correspond to the model p, where d=Lp. The calculated seismic data is then compared to the measured seismic data and if the fit is not good enough, the model p is adjusted and the process is repeated. This process continues until the calculated seismic data fits (with a given but acceptable error) the measured seismic data. When this happens, the model p is considered to be acceptable and various other processing steps are performed based on the model p, to eventually generate an image of the surveyed subsurface.

A wave-field separation method that does not use inversion is the PZ summation method described in U.S. Patent Publication Application 2012/0213032, assigned to assignee of this application. The PZ summation refers to the calculation of the up-going wave-field U as a sum, after appropriate weighting, of the P and V seismic data (corresponding to the hydrophone data h and particle motion velocity v discussed above). The same PZ summation method may use a difference of the P and V seismic data for calculating the down-going wave-field D. However, there are PZ summation methods that may use an inversion process. A common feature of the PZ summation methods is that they are ghost model-independent methods, i.e., these methods do not rely on a ghost model. Another class of separation methods are those that rely on a ghost model, and these are called "ghost model-dependent" methods.

Returning to step 202, it uses as input the hydrophone data h and the particle velocity data v and applies a non-inversion separation method (e.g., PZ summation) to separate the first up-going wave-fields $U_1$ from the first down-going wave-fields $D_1$, where the label "first" refers to the application of the first separation method. In one embodiment, the first up-going wave-fields $U_1$ may be calculated as a weighted sum of the pressure data P and the particle velocity data Z. In another embodiment, the first down-going wave-fields $D_1$ are calculated as a weighted difference of the pressure data P and the particle velocity data Z. The output of this step is the first up-going wave-field $U_1$, or the first down-going field $D_1$ or both, which is generically referred to herein as "first up-down separated data."

This output from step 202 is used as input for step 204 as now discussed. The second up-down separation may use, in one embodiment, an inversion method as illustrated by equation (9)

$$\begin{pmatrix} h_1 \\ h_2 \\ h_{N_h} \\ LC(h_1 \pm vz_1)/2 \\ LC(h_2 \pm vz_2)/2 \\ LC(h_N \pm vz_N)/2 \end{pmatrix} = \begin{pmatrix} e^{-2\pi i f \tau_u} + \mathrm{Re}^{-2\pi i f \tau_d} \\ LC(e^{-2\pi i f \tau_{u/d}}) \end{pmatrix} \begin{pmatrix} p_1 \\ p_2 \\ p_3 \\ p_M \end{pmatrix}, \quad (9)$$

where LC is a low-cut filter, $h_i$ is the hydrophone data, $vz_i$ is the particle motion data and $h_i \pm vz_i$ is the first up-going or the first down-going wave-field obtained in step 202. Note that the time shifts used in the bottom half of the matrix should respect the up-going and/or down-going wave field data output from the first wave field separation. For example, PZ summation would relate to $\tau_u$ and PZ subtraction would relate to $\tau_d$. Those skilled in the art would understand that a combination of the up-going and down-going wave-fields obtained in step 202 may be used in equation (9) instead of the up-going wave-fields or the down-going wave-fields.

This single inversion illustrated by equation (9) is constrained by the hydrophone data (h) for all frequencies, and is constrained by the PZ summation or difference for the high frequencies. In this formulation, it is assumed that the input vz was processed prior to the PZ summation with an obliquity correction. The high frequencies are now constrained by the PZ summation result, which is free of the wave height assumption. However, the high frequencies are also constrained by the hydrophone data, h, which in the case of a non-horizontal datum will degrade the result relative to the PZ summation. Note that other methods may be used in step 202 instead of the PZ summation as long as they are ghost model-independent.

While equation (9) illustrates the second up-down separation of step 204 being constrained by the hydrophone data h, it is also possible to have the second up-down separation in step 204 constrained by the particle motion data vz as in equation (10), $$\begin{pmatrix} vz_1 \\ vz_2 \\ vz_{N_p} \\ LC(h_1 \pm vz_1)/2 \\ LC(h_2 \pm vz_2)/2 \\ LC(h_N \pm vz_N)/2 \end{pmatrix} = \begin{pmatrix} e^{-2\pi i f \tau_u} - \mathrm{Re}^{-2\pi i f \tau_d} \\ LC(e^{-2\pi i f \tau_{u/d}}) \end{pmatrix} \begin{pmatrix} p_1 \\ p_2 \\ p_3 \\ p_M \end{pmatrix}, \quad (10)$$

or it can be constrained by both the hydrophone data h and the particle motion data vz as in equation (11), $$\begin{pmatrix} h_1 \\ h_2 \\ h_{N_h} \\ vz_1 \\ vz_2 \\ vz_{N_p} \\ LC(h_1 \pm vz_1)/2 \\ LC(h_2 \pm vz_2)/2 \\ LC(h_N \pm vz_N)/2 \end{pmatrix} = \begin{pmatrix} e^{-2\pi i f \tau_u} + \mathrm{Re}^{-2\pi i f \tau_d} \\ e^{-2\pi i f \tau_u} - \mathrm{Re}^{-2\pi i f \tau_d} \\ LC(e^{-2\pi i f \tau_{u/d}}) \end{pmatrix} \begin{pmatrix} p_1 \\ p_2 \\ p_3 \\ p_M \end{pmatrix}, \quad (11)$$

The output of the step 204 of applying the second up-down separation is the second up-down separated data, i.e., second up-going wave-fields $U_2$, second down-going wave-fields $D_2$ and/or both the second up-going wave-fields $U_2$ and the second down-going wave-fields $D_2$. The label "second" refers to the application of the second separation method.

Those skilled in the art would understand that the second separation method is influenced (or constrained or affected) by the first separation method because the first up-down separated data ($U_1$ or $D_1$ or $U_1$ and $D_1$) is used in equation (9) or (10) or (11) for calculating the second up-down separated data ($U_2$ or $D_2$ or $U_2$ and $D_2$).

Returning to equation (9), because the hydrophone data h may degrade the results of step 204 for a case of non-horizontal sea surface datum, it is possible to avoid this problem by applying a high-cut filter HC to this data as illustrated in equation (12):

$$\begin{pmatrix} HC(h_1) \\ HC(h_2) \\ HC(h_N) \\ LC(h_1 + vz_1)/2 \\ LC(h_2 + vz_2)/2 \\ LC(h_N + vz_N)/2 \end{pmatrix} = \begin{pmatrix} HC(e^{-2\pi i f \tau_u} + \mathrm{Re}^{-2\pi i f \tau_d}) \\ LC(e^{-2\pi i f \tau_u}) \end{pmatrix} \begin{pmatrix} p_1 \\ p_2 \\ p_3 \\ p_M \end{pmatrix}. \quad (12)$$

Similar high-cut filters may be applied to equations (10) and/or (11) if desired.

The inversion represented by equation (12) is constrained by the hydrophone data on the low frequencies, and constrained by the PZ summation for the high frequencies. For this equation, it is assumed that the input vz data was processed prior to PZ summation to correct for obliquity.

However, in one embodiment, instead of pre-processing the vz data for obliquity, it is possible to build the obliquity correction into the equations. For example, in this case, the PZ summation is inaccurate due to the lack of obliquity correction. As shown below, the linear operator is modified to include the summation of a pressure term and a vz term, the vz term including an obliquity correction. By adding a cosine terms in the matrix L, the inaccuracy is encoded as part of the inversion, as illustrated in equation (13), $$\begin{pmatrix} HC(h_1) \\ HC(h_2) \\ HC(h_N) \\ LC(h_1 + vz_1) \\ LC(h_2 + vz_2) \\ LC(h_N + vz_N) \end{pmatrix} = \begin{pmatrix} HC(e^{-2\pi i f \tau_u} + Re^{-2\pi i f \tau_d}) \\ LC(pressureterm + \cos\theta_m vzterm) \end{pmatrix} \begin{pmatrix} p_1 \\ p_2 \\ p_3 \\ p_M \end{pmatrix} \quad (13)$$

$$= \begin{pmatrix} HC(e^{-2\pi i f \tau_u} + Re^{-2\pi i f \tau_d}) \\ LC\begin{pmatrix} [e^{-2\pi i f \tau_u} + Re^{-2\pi i f \tau_d}] + \\ \cos\theta_m[e^{-2\pi i f \tau_u} - Re^{-2\pi i f \tau_d}] \end{pmatrix} \end{pmatrix} \begin{pmatrix} p_1 \\ p_2 \\ p_3 \\ p_M \end{pmatrix}$$

$$= \begin{pmatrix} HC(e^{-2\pi i f \tau_u} + Re^{-2\pi i f \tau_d}) \\ LC\begin{pmatrix} (\cos\theta_m + 1)e^{-2\pi i f \tau_u} - \\ R(\cos\theta_m - 1)e^{-2\pi i f \tau_d} \end{pmatrix} \end{pmatrix} \begin{pmatrix} p_1 \\ p_2 \\ p_3 \\ p_M \end{pmatrix}.$$

This inversion equation is constrained by the hydrophone on the low frequencies, and constrained by the PZ summation for the high frequencies while obliquity compensation is made in the inversion matrix L. The same correction may be applied to equations (10) and/or (11).

Instead of the step 204 being constrained by an estimate of first up-going wave-field, as illustrated in equations (12) and (13), the second wave-field separation may be constrained by an estimate of a first down-going wave-field, for example:

$$\begin{pmatrix} HC(h_1) \\ HC(h_2) \\ HC(h_N) \\ LC(h_1 - vz_1)/2 \\ LC(h_2 - vz_2)/2 \\ LC(h_N - vz_N)/2 \end{pmatrix} = \begin{pmatrix} HC(e^{-2\pi i f \tau_u} + Re^{-2\pi i f \tau_d}) \\ LC(e^{-2\pi i f \tau_d}) \end{pmatrix} \begin{pmatrix} p_1 \\ p_2 \\ p_3 \\ p_M \end{pmatrix}, \quad (14)$$

which is consistent with equation (9), or an estimate of a first down-going wave-field with the obliquity built into the L matrix, as illustrated in equation (15), $$\begin{pmatrix} HC(h_1) \\ HC(h_2) \\ HC(h_N) \\ LC(h_1 - vz_1) \\ LC(h_2 - vz_2) \\ LC(h_N - vz_N) \end{pmatrix} = \begin{pmatrix} HC(e^{-2\pi i f \tau_u} + Re^{-2\pi i f \tau_d}) \\ LC\begin{pmatrix} (1 - \cos\theta_m)e^{-2\pi i f \tau_u} + \\ R(1 + \cos\theta_m)e^{-2\pi i f \tau_d} \end{pmatrix} \end{pmatrix} \begin{pmatrix} p_1 \\ p_2 \\ p_3 \\ p_M \end{pmatrix}. \quad (15)$$

The low-cut and high-cut filters may be designed to reduce the impact of noise on the inversion, for example bandpass filters. There may be some overlap in frequencies between the two. This filtering may be time and space variant as required and may be considered as generic data domain sparseness or high resolution weights. In general, these filters may be considered as generic filters (e.g., high, low, bandpass, in time and/or in space). In general, the filter will relate to the signal-to-noise ratio, S/N, of the data. While the example given here relates to accelerometer data having a low S/N at low frequencies, it may also include poor signal to noise at other frequencies, for example in the ghost notch.

While the above discussion has used 2D examples for the model domain, the method may be applied in 1D, 2D, 3D, etc. Different model domains may be used instead of the tau-p domain, as discussed in the references listed at the end of the specification. Some examples include frequency-wavenumber (FK), curvelet, wavelet, contourlet, parabolic Radon, hyperbolic Radon, etc.

The data and model domain may be in the time domain or a spectral domain, e.g., on frequency slices.

The inversion method used in step 204 may be solved using linear or non-linear inversion. A variety of methods may be employed as also described in the references at the end of the specification. These may include conjugate gradients, Choletsky factorisation, LU decomposition, pseudo-inverse or 'deconvolution approach', etc.

The number of conjugate gradient iterations may vary as sparseness weights are calculated. For example, a small number of iterations may be used to derive the weights, which may then be used for a new inversion which uses more conjugate gradient iterations.

For a time domain inversion, the low frequencies may converge faster than the high frequencies. For this reason, it is possible to choose to update different frequency ranges for different conjugate gradient loops. An example in this regard is as follows:

Iterations 1-5: Frequencies 0-125 Hz
Iterations 6-8: Frequencies 20-125 Hz
Iterations 9-10: Frequencies 60-125 Hz
Iterations 11-12: Frequencies 80-125 Hz The number of iterations may be hard coded by a user or determined automatically by the level or residual (unexplained data) at different frequencies during the inversion.

The 'deconvolution approach' may involve approximating the inverse to $L^H L$ by filters, e.g., a first step of receiving the seismic data, a second step of applying L to the output of the first step, a third step of applying $L^H$ to the output of the second step, a fourth step of calculating a filter to convert the output of the third step to the output of the first step, and a fifth step of applying a filter to the data of the first step. The filter may be 1D, 2D, 3D, etc. and may be constrained by sparseness weights or for a range of dips.

The inversion may be least squares, l1, l0, Cauchy norm, high resolution, sparse, etc. Alternatively, an anti-leakage style solver may be used where model parameters are decomposed one at a time, the effect of each model parameter being subtracted from the input before later model parameters are estimated.

The inversion of step 204 may be applied on a whole gather or on spatial and/or temporal windows of data. Weights may be iteratively updated (e.g., iteratively reweights least squares inversion). In one embodiment, sparseness weights may be derived based on the envelope of a previous inversion. Sparseness weights may be designed to prevent aliasing by first deriving a model for low frequencies, and using the model to define sparseness weights for higher frequency inversions. In one application, sparseness weights may be designed to separate energy on to different dips, i.e., based on the amplitude of energy within a temporal window of data in the model domain. This may involve setting parts of the sparseness weights to zero, sometimes known as reducing the rank of the model. Weights may, for example, be a function of any of the following: time, tau, offset-x, offset-y, offset, slowness-x, slowness-y, slowness, frequency. Data domain sparseness weights may also be used, for example, based on data quality (e.g., S/N ratio).

The final step in FIG. 2 is generating an image of the surveyed subsurface. This imaging step may be performed based on the output of step 204, i.e., the second up-going wave-field $U_2$, the second down-going wave-field $D_2$, or a combination of the initial seismic data and one of the second up-going or down-going wave-field.

With regard to the seismic data received in step 200, it can be collected with towed streamer, ocean bottom survey, cable, node, nodes on a rope, autonomous receiver (e.g., hydrostatically balanced with or without its own propulsion), land sensors, transition zone sensors, etc. The seismic data may be recorded with any type of seismic sensor, as for example, hydrophone, accelerometer, geophone, differential hydrophone, particle velocity sensor, particle motion sensor, etc.

The seismic sources used to generate the seismic data are not limited to any specific type of sources. Some source types include airgun, vaporchoc, flexichoc, marine vibrator, land vibrator, weight drop, dynamite, sparker, boomer, etc., all of which are known in the art and thus, their description is omitted herein.

Figure 3:
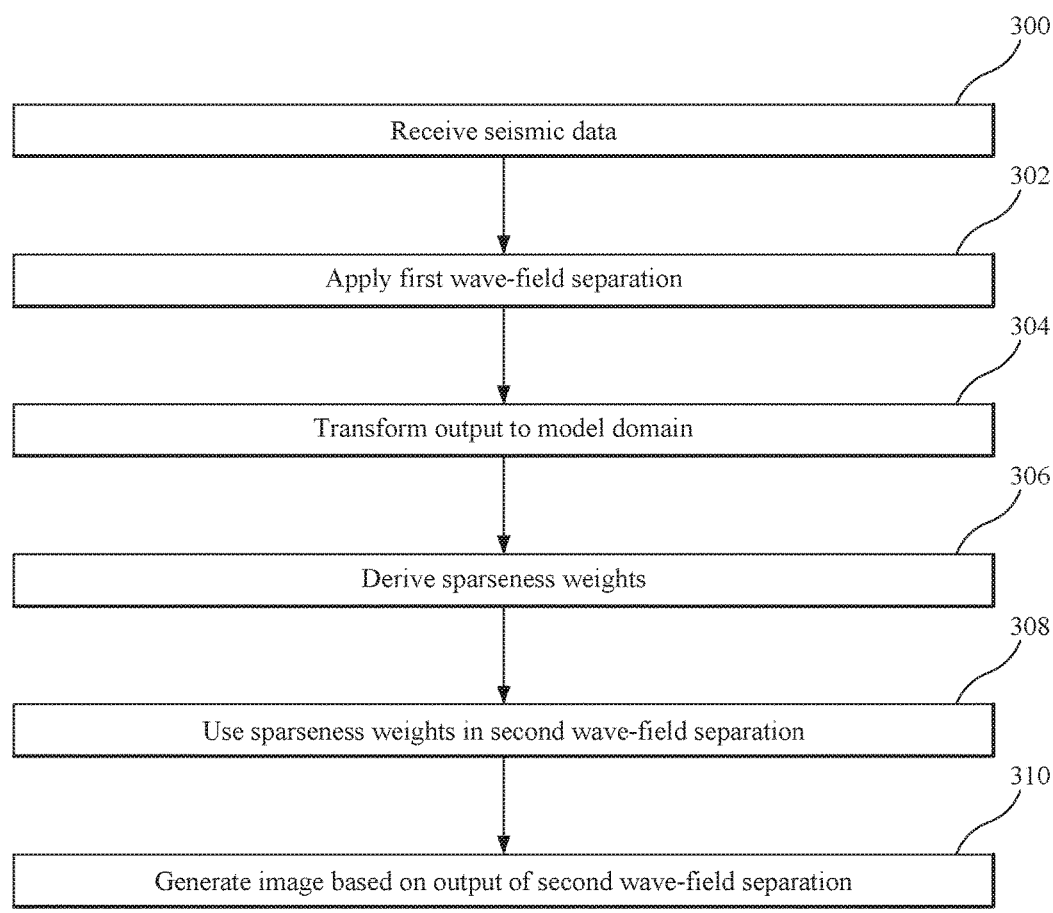
FIG. 3 is flowchart of another method for separating up-going wave-fields from down-going wave-fields.

While the discussion above regarding the method illustrated in FIG. 2 has involved using the result of a first deghosting approach (step 202) to constrain a second deghosting approach (step 204), the method is not limited to this embodiment. Those skilled in the art would understand that some other embodiments may be derived based on the method of FIG. 2 in which, for example, a first wave-field separation is used to define sparseness weights for a second wave-field separation. Such a method is illustrated in FIG. 3 and includes a step 300 of receiving seismic data containing up-going and down-going wave-fields, a step 302 of applying a first wave-field separation (e.g., PZ summation) to the received seismic data to separate the up-going wave-fields from the down-going wave-fields, a step 304 of transforming the result of the first wave-field separation to a model domain, e.g., tau-p domain, a step 306 of deriving sparseness weights based on the result of step 302, for example, by calculating an envelope of those results, a step 308 of using the sparseness weights from step 306 for a second wave-field separation which may include one or more measurement types, and a step 310 of generating an image of the subsurface based on the output of step 308.

Figure 4:
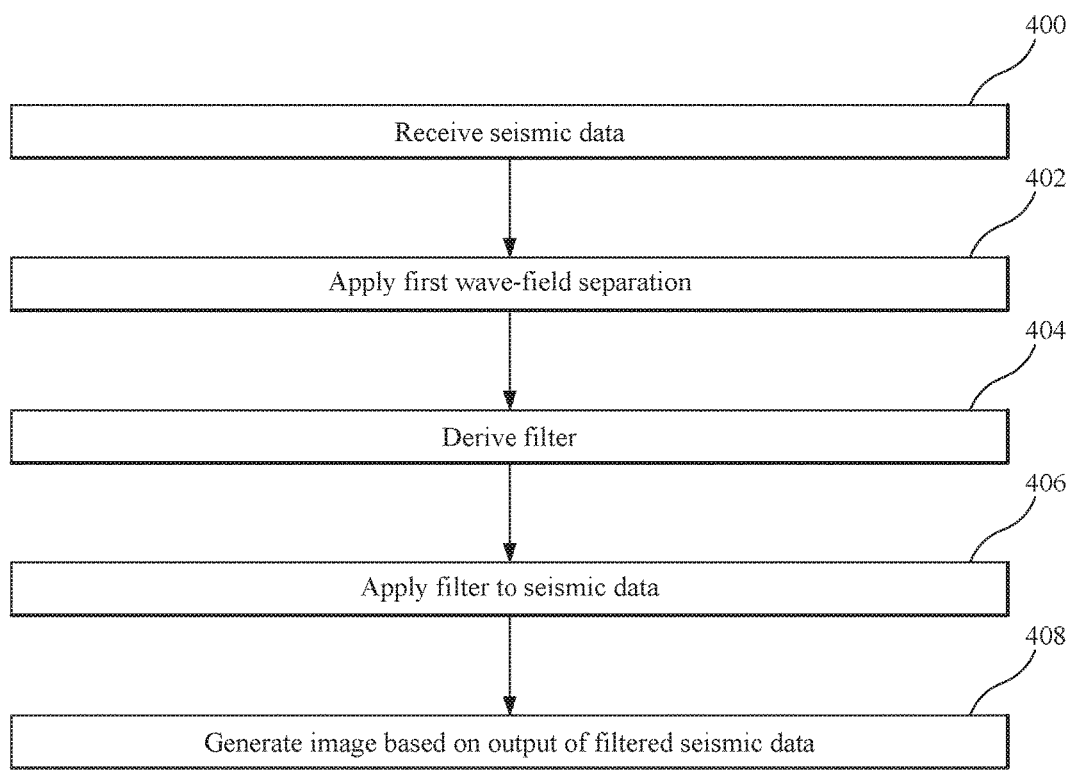
FIG. 4 is flowchart of still another method for separating up-going wave-fields from down-going wave-fields.

FIG. 4 illustrates another variation of the method illustrated in FIG. 2. The method of FIG. 4 uses the first wave-field separation to constrain a filter relating to the second wave-field separation. More specifically, the method includes a step 400 of receiving seismic data (or input data) containing up-going and down-going wave-fields. This data is similar to the data received in step 200 of the method illustrated in FIG. 2. The method also includes a step 402 of applying a first wave-field separation method (similar to step 202 in FIG. 2) for separating the up-going wave-fields from the down-going wave-fields. In step 404, a filter is designed/derived to shape the input data in step 400 to fit the output of step 402. The filter may be in any domain, e.g., tau-p or (x-t), it may be in one or more dimensions, it may relate to a convolution or a multiplication (for example in a frequency domain), and the filter may be derived using sparseness constraints. In step 406, the filter is applied to the input data from step 400 and in step 408 an image is generated based on the filtered data.

One or more of the embodiments discussed herein are not reliant on the horizontal sea surface assumption for the high frequencies, which improves the deghosting results.

Once the model p from equations (9) to (15) has been found, it may be used in various ways. For example, the model may be used for:

Wavefield separation (separating up-going and down-going energy)
  Output primary (which may be processed directly or subtracted from the input to form a ghost dataset),
  Output ghost (which may be processed directly or subtracted from the input to form a primary dataset).
Data reconstruction at new positions;
  in depth, and/or
  in between the streamers.
Joint up-down separation with source designature, for example, by extending the embodiments herein to include a source resignature term as described in Poole, G., S. King, and J. Cooper, 2016, Simultaneous source designature and receiver deghosting in the joint shot-receiver domain: 78th Annual International Conference and Exhibition, EAGE, Expanded Abstracts.
Simulate hydrophone or particle velocity/acceleration measurements;
Reduce the noise content of data; random, coherent, cross-talk, interference noise;
Obliquity correction;
Correct the PZ summation result for obliquity;
Array compensation;
Demultiple; and
Migration.

Those skilled in the art would know to use the model p for other processing operations in the seismic field and also to use a combination of the above processes.

The ghost model-dependent deghosting may be modified based on a non-horizontal sea surface as described in PCT/IB2015/001930, Poole, G., et al. "Wavefield reconstruction using a reflection from a variable sea surface."

Figure 5:
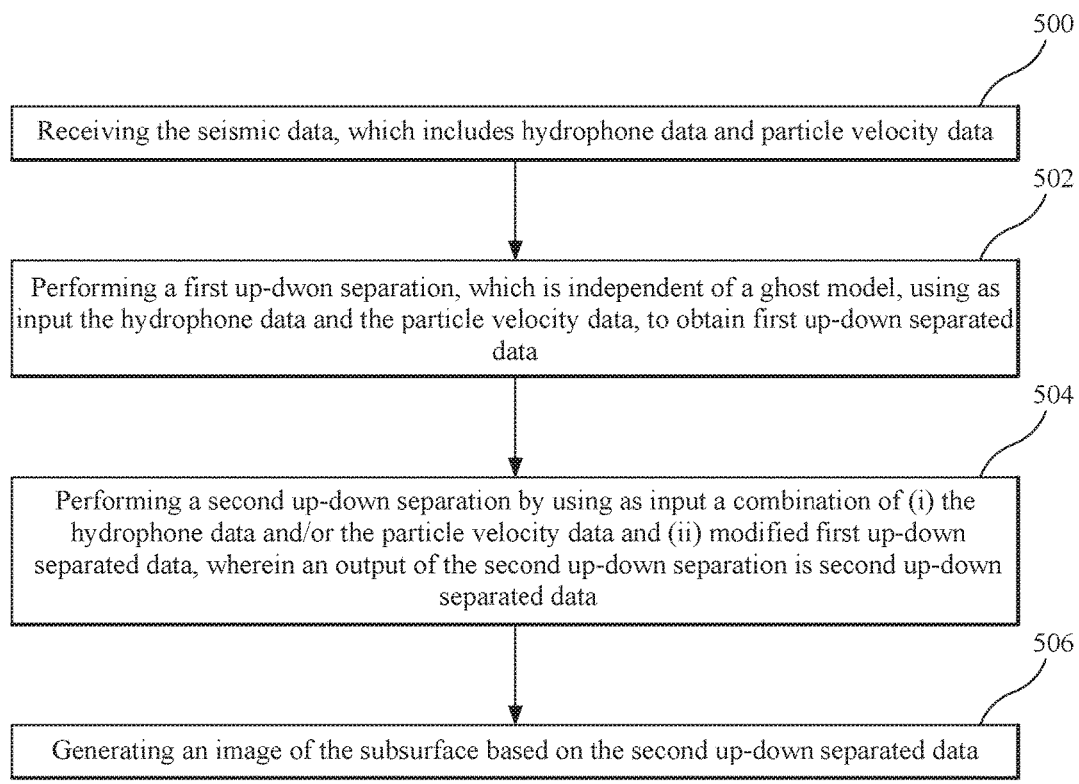
FIG. 5 is flowchart of yet another method for separating up-going wave-fields from down-going wave-fields.

According to an embodiment illustrated in FIG. 5, there is a method for up-down separation of seismic data that includes a step 500 of receiving the seismic data, which includes hydrophone data and particle velocity data, a step 502 of performing a first up-down separation, which is independent of a ghost model, using as input the hydrophone data and the particle velocity data, to obtain first up-down separated data, a step 504 of performing a second up-down separation by using as input a combination of (i) the hydrophone data and/or the particle velocity data and (ii) modified or not first up-down separated data, wherein an output of the second up-down separation is second up-down separated data, and a step 506 of generating an image of the subsurface based on the second up-down separated data.

In one application, the input for the second up-down separation includes (1) only the hydrophone data and (2) the modified first up-down separated data. In another application, the input for the second up-down separation includes (1) only the particle velocity data and (2) the modified first up-down separated data. In still another application, the input for the second up-down separation includes (1) the hydrophone data, (2) the particle velocity data and (3) the modified first up-down separated data. In one embodiment, the second up-down separation is a ghost model-dependent process. The modified first up-down separated data may be a summation of the hydrophone data and the particle velocity data, or a difference between the hydrophone data and the particle velocity data. The particle velocity data is corrected in one application for obliquity prior to the first up-down separation. The particle velocity data is processed to reduce a noise content prior to the first up-down separation in another application.

In one application, the separated ghost wave-fields from the second up-down separation process may be subtracted from input seismic data to obtain a processed data set to be used to generate an image of a surveyed subsurface, or the second ghost wave-fields are directly used to generate the image of the surveyed subsurface.

Input data for any of the above methods may be in any pre-stack domain, for example shot, receiver, midpoint, conversion point or cross-spread. The intention is that any of the above implementations would be made on a computer. In particular, this may require more demands on sparseness constraints, e.g., beginning by solving the equations for a low frequency bandwidth which is not aliased, and using the model to derive sparseness weights for the higher frequency model solution. Also, it may be possible to use as input pressure and particle motion data and to generate an output that represents only pressure wave-fields or only particle motion wave-fields.

The following comments relate to the design and use of the L matrix discussed above. Particle velocity data may be obtained from individual sensors, or summed (average or weighed sum) to form a receiver group. Particle velocity data may have been acquired directly or may be computed from accelerometer sensors (for example, by integration). Other types of particle motion sensor may be available. While the above embodiments relate to modeling of particle velocity data, a differentiation step may be included in the matrix formulations to work directly with accelerometer data. The differentiation could be applied in the time or the frequency domain. Receivers generate a marine streamer dataset that is achieved in a narrow, wide or multi-azimuth, coil shooting or any configuration towed with constant or variable depth (e.g., slant streamer, BroadSeis profile, over-under streamers), and the seismic data is generated with an air gun, marine vibrator, or other source element. Source elements may be fired according to any known scheme, e.g., continuously, simultaneously, flip-flop, etc. Receivers may also be used in ocean bottom survey (nodes, cables, or other with air gun, marine vibrator or other source), land dataset (dynamite, vibrator or other source), or a combination of two or more dataset types. The data may have been calibrated before applying the processes discussed herein, or calibration scalars may be included in the matrix formulations noted in the embodiments. Water velocity terms may be constant or allowed to vary, for example, with space (x/y direction)/depth (z-direction). Variation with depth can be of use for OBS datasets where there is a water velocity gradient. The methods may be used for one-sided or split-spread acquisition.

Equations described herein may be solved in the time domain or a spectral domain (e.g., frequency, Laplace, z-transform, etc.), wavelet domain (e.g., curvelet or other). Model p may be found through any inversion method, e.g., conjugate gradients, LU decomposition, Cholesky factorization, etc. Model p may be derived to represent all traces in the input shot, or may work on a subset of data from the input shot, for example, spatial windows of a given number of channels. Sparseness weights may be used in the inversion to improve results, for example, where there is poor signal-to-noise ratio or to overcome aliasing; e.g. iteratively reweighted least squares beginning with low frequencies and working up to higher frequencies. Other model domains may be used, for example, frequency-wavenumber (FK), parabolic Radon, hyperbolic Radon, etc. In fact, any fixed datum model domain may be defined as long as it can be reverse transformed and reghosted for both hydrophone and particle velocity sensor data. Alternatively, an iterative approach similar to the anti-leakage tau-p transform can be used which also exhibits sparseness properties. No matter how the model is formed, it needs to simultaneously reproduce the hydrophone and particle velocity measurements through application of an operator, e.g., L.

Due to differing signal to noise ratio of hydrophone and particle velocity data, it may be necessary to define the inversion so as to satisfy the hydrophone data for a broader bandwidth than the particle velocity data. This may be implemented by including a frequency dependent scaling term into the matrix or bandpass filtering the model and data for different conjugate gradient passes either by multiplication in the frequency domain or convolution by a bandpass filter in the time domain. For example, application of L may include a bandpass filter so that when applied the bandwidth of particle velocity components is 25 Hz to 250 Hz, whereas the bandpass filter for hydrophone data is 2 Hz to 250 Hz. Conjugate gradient inversion begins by computing $L^T d$ from d, and continues by combining frequency filtering into L. The bandwidth of $L^T d$ will automatically be adjusted and be consistent for the later applications of L and $L^T$ in the conjugate gradient flow.

It can also be possible to process hydrophone and particle motion data independently. The separate results may be combined afterwards, for example, by selecting different temporal frequency ranges based on signal-to-noise ratio data. At low frequencies, particle velocity data may be too noisy to be of value. Therefore, it may be necessary to use a pressure-only solution for low frequencies, and make use of a combined hydrophone-particle velocity solution for higher frequencies.

Figure 6:
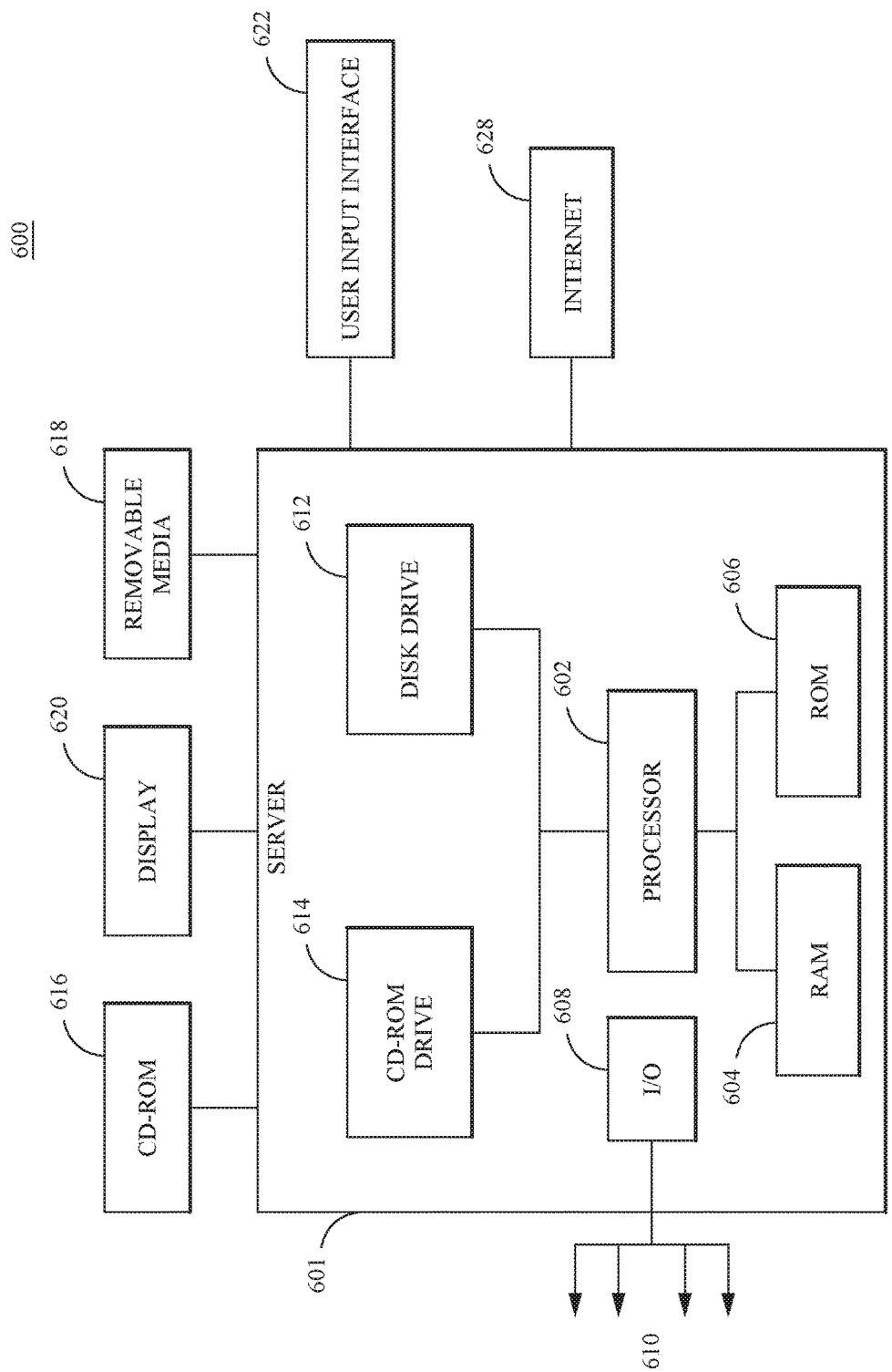
FIG. 6 is a schematic diagram of a computing device on which one or more of the above methods for processing seismic data may be implemented.

The above-discussed procedures and methods may be implemented in a computing device as illustrated in FIG. 6. Hardware, firmware, software or a combination thereof may be used to perform the various steps and operations described herein. Computing device 600 of FIG. 6 is an exemplary computing structure that may be used in connection with such a system.

Exemplary computing device 600 suitable for performing the activities described in the exemplary embodiments may include a server 601. Such a server 601 may include a central processor (CPU) 602 coupled to a random access memory (RAM) 604 and to a read-only memory (ROM) 606. ROM 606 may also be other types of storage media to store programs, such as programmable ROM (PROM), erasable PROM (EPROM), etc. Processor 602 may communicate with other internal and external components through input/output (I/O) circuitry 608 and bussing 610 to provide control signals and the like. Processor 602 carries out a variety of functions as are known in the art, as dictated by software and/or firmware instructions.

Server 601 may also include one or more data storage devices, including hard drives 612, CD-ROM drives 614 and other hardware capable of reading and/or storing information, such as DVD, etc. In one embodiment, software for carrying out the above-discussed steps may be stored and distributed on a CD-ROM or DVD 616, a USB storage device 618 or other form of media capable of portably storing information. These storage media may be inserted into, and read by, devices such as CD-ROM drive 614, disk drive 612, etc. Server 601 may be coupled to a display 620, which may be any type of known display or presentation screen, such as LCD, plasma display, cathode ray tube (CRT), etc. A user input interface 622 is provided, including one or more user interface mechanisms such as a mouse, keyboard, microphone, touchpad, touch screen, voice-recognition system, etc.

Server 601 may be coupled to other devices, such as sources, detectors, etc. The server may be part of a larger network configuration as in a global area network (GAN) such as the Internet 628, which allows ultimate connection to various landline and/or mobile computing devices.

The disclosed exemplary embodiments provide a computing device, software instructions and a method for seismic data processing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

Poole, G., 2013, "Pre-migration receiver de-ghosting and re-datuming for variable depth streamer data," SEG 2013 Annual Meeting, Expanded Abstracts 29, 3406-3410;

Poole, G., 2014, "Wavefield separation using hydrophone and particle velocity components with arbitrary orientation," SEG 2014 Annual Meeting, Expanded Abstracts;

Poole, G., Patent application publication no. US 2015/0212222.

Poole, G., Patent application publication no. US 2013/0163376 and associated Continuation-in-part;

Poole, G., Patent Application Publication Nos.: US 2013/0163379, US 2013/0163376, and US 2015/0212222;

Poole, G. et al., International Patent Application No. PCT/IB2015/000784;

Poole, G., Davison, C., Deeds, J., Davies K., and Hampson, G., 2013, "Shot-to-shot directional designature using near-field hydrophone data", SEG conference proceedings;

Poole, G., Cooper, J., King, S., and Wang, P., 2015, "3D source designature using source-receiver symmetry in the shot tau-px-py domain", EAGE conference proceedings;

Poole, G., and King, S., "Demultiple using up/down separation of towed variable-depth streamer data, U.S. patent application publication 2015/0109881;

Poole, G., and King, S., Wavefield reconstruction using a reflection from a variable sea surface, PCT/IB2015/001930.

Wang et al., 2014, "Joint hydrophone and accelerometer receiver deghosting using sparse tau-p inversion," SEG 2014 expanded abstracts;

Wang et al., 2014, "3D joint deghosting and crossline interpolation for marine single-component streamer data," SEG 2014 expanded abstracts;

Wang et al., 2013, "Pre-migration deghosting for marine streamer data using a bootstrap approach in Tau-P domain," SEG Conference and proceedings; and Wang and Peng, 2012, "Pre-migration deghosting for marine towed streamer data using a bootstrap approach," SEG conference proceedings.

What is claimed is:

1. A method performing up-down separations of seismic data, the method comprising:
   receiving the seismic data, which includes hydrophone data and particle motion data;
   performing a first up-down separation, which is independent of a ghost model, using as input the hydrophone data and the particle motion data, to obtain first up-down separated data;
   performing a second up-down separation by using as input a combination of (i) the hydrophone data and/or the particle motion data and (ii) the first up-down separated data, the second up-down separation outputting second up-down separated data; and
   generating an image of the subsurface based on the second up-down separated data.

2. The method of claim 1, wherein the input for the second up-down separation includes (1) only the hydrophone data and (2) the first up-down separated data.

3. The method of claim 1, wherein the input for the second up-down separation includes (1) only the particle motion data and (2) the first up-down separated data.

4. The method of claim 1, wherein the input for the second up-down separation includes (1) the hydrophone data, (2) the particle motion data and (3) the first up-down separated data.

5. The method of claim 1, wherein the second up-down separation is a ghost model-dependent process.

6. The method of claim 1, wherein the first up-down separated data is a summation of the hydrophone data and the particle motion data.

7. The method of claim 6, wherein the particle motion data is corrected for obliquity prior to the first up-down separation.

8. The method of claim 1, wherein the particle motion data is processed to reduce a noise content prior to the first up-down separation.

9. The method of claim 1, wherein the first up-down separated data is a difference between the hydrophone data and the particle motion data.

10. The method of claim 1, wherein the second up-down separation is an inversion process that calculates a wavefield separated model p based on the seismic data and a matrix L, which depends on time delays associated with up-going wave-fields and down-going wave-fields.

11. A computing device performing up-down separations of seismic data, the computing device comprising:
    an interface configured to receive the seismic data, which includes hydrophone data and particle motion data; and
    a processor connected to the interface, the processor configured to,
    perform a first up-down separation, which is independent of a ghost model, using as input the hydrophone data and the particle motion data, to obtain first up-down separated data, perform a second up-down separation by using as input a combination of (i) the hydrophone data and/or the particle motion data and (ii) the first up-down separated data, the second up-down separation yielding second up-down separated data, and generate an image of the subsurface based on the second up-down separated data.

12. The computing device of claim 11, wherein the input for the second up-down separation includes (1) only the hydrophone data and (2) the first up-down separated data.

13. The computing device of claim 11, wherein the input for the second up-down separation includes (1) only the particle motion data and (2) the first up-down separated data.

14. The computing device of claim 11, wherein the input for the second up-down separation includes (1) the hydrophone data, (2) the particle motion data and (3) the first up-down separated data.

15. The computing device of claim 11, wherein the second up-down separation is a ghost model-dependent process.

16. The computing device of claim 11, wherein the first up-down separated data is a summation of the hydrophone data and the particle motion data.

17. The computing device of claim 11, wherein the particle motion data is processed to reduce a noise content prior to the first up-down separation.

18. The computing device of claim 11, wherein the first up-down separated data is a difference between the hydrophone data and the particle motion data.

19. The computing device of claim 11, wherein the second up-down separation is an inversion process that calculates a wave-field separated model p based on the seismic data and a matrix L, which depends on time delays associated with up-going wave-fields and down-going wave-fields.

20. A non-transitory computer readable medium including computer executable instructions, wherein the instructions, when executed by a processor, implement instructions for performing up-down separations of seismic data, the instructions executing a method comprising:

receiving the seismic data, which includes hydrophone data and particle motion data;

performing a first up-down separation, which is independent of a ghost model, using as input the hydrophone data and the particle motion data, to obtain first up-down separated data;

performing a second up-down separation by using as input a combination of (i) the hydrophone data and/or the particle motion data and (ii) the first up-down separated data, the second up-down separation outputting second up-down separated data; and generating an image of the subsurface based on the second up-down separated data.

* * * * *